(12) United States Patent
Nair

(10) Patent No.: US 7,369,603 B2
(45) Date of Patent: May 6, 2008

(54) COMPENSATING FOR SPECTRAL ATTENUATION

(75) Inventor: Sathian T. Nair, Kerala (IN)

(73) Assignee: Intel Corporation, Santa Clara, CA (US)

( * ) Notice: Subject to any disclaimer, the term of this patent is extended or adjusted under 35 U.S.C. 154(b) by 853 days.

(21) Appl. No.: 10/447,339

(22) Filed: May 28, 2003

(65) Prior Publication Data

US 2004/0240534 A1 Dec. 2, 2004

(51) Int. Cl.
*H04B 1/38* (2006.01)
*H04L 5/16* (2006.01)

(52) U.S. Cl. .................. 375/222; 375/219; 375/220; 375/231; 375/232; 375/350

(58) Field of Classification Search ............... 375/222, 375/224, 219, 220, 231, 233, 350; 342/189; 341/143
See application file for complete search history.

(56) References Cited

U.S. PATENT DOCUMENTS

| | | | |
|---|---|---|---|
| 4,672,670 A * | 6/1987 | Wang et al. .............. 704/217 |
| 5,031,194 A * | 7/1991 | Crespo et al. ............. 375/233 |
| 5,483,243 A * | 1/1996 | Gramlich et al. .......... 342/189 |
| 5,646,621 A * | 7/1997 | Cabler et al. .............. 341/143 |
| 6,118,879 A * | 9/2000 | Hanna ....................... 381/106 |
| 6,219,378 B1 * | 4/2001 | Wu ............................ 375/231 |
| 6,608,862 B1 * | 8/2003 | Zangi et al. ............... 375/232 |
| 2002/0106035 A1 * | 8/2002 | Harikumar et al. ........ 375/316 |
| 2003/0023430 A1 * | 1/2003 | Wang et al. ............... 704/226 |
| 2004/0209585 A1 * | 10/2004 | Wang et al. ............. 455/226.1 |

\* cited by examiner

*Primary Examiner*—Phuong Phu
(74) *Attorney, Agent, or Firm*—Kacvinsky LLC

(57) ABSTRACT

A method and apparatus to compensate for spectral attenuation are described wherein the spectral attenuation for a communications channel is determined, a first filter is created for the attenuation and the first filter compensates for the attenuation. The spectral attenuation for the communications channel is determined by a received L sequence signal that is used to model the spectral attenuation as a second filter. Other embodiments are described and claimed.

14 Claims, 9 Drawing Sheets

COMPENSATING FOR SPECTRAL ATTENUATION

BACKGROUND

Analog data modems may transmit information over a network, such as the Public Switched Telephone Network (PSTN). For example, a first modem may establish a connection to a second modem over a communication channel through the PSTN. While establishing the connection, the first and second modems may test the communication channel to assist in setting up the connection. The modems may test for certain characteristics of the communication channel, and configure certain compensation settings in accordance with the found characteristics. Consequently, the quality of a modem connection may vary considerably depending upon the results of the testing and compensation process. Accordingly, it can be appreciated that there may be need for improvements in such techniques in a device or network.

BRIEF DESCRIPTION OF THE DRAWINGS

The subject matter referred to herein as embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Figure 1:
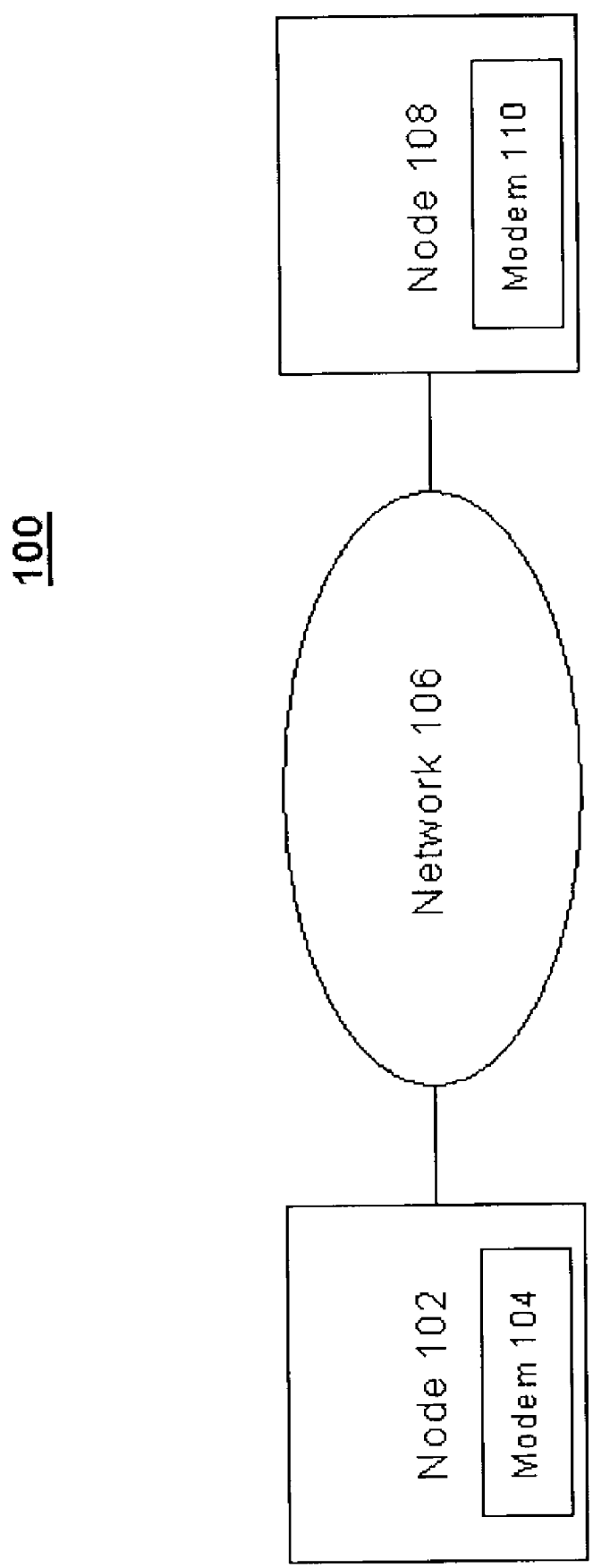
FIG. 1 illustrates a system suitable for practicing one embodiment.

The embodiments may be directed to modems in general. More particularly, one embodiment may be directed to a method and apparatus to assist a modem in compensating for one or more characteristics of a communications channel. The term "communications channel" as used herein may refer to the combination of physical transmission mediums, devices and/or signals between two end points.

Prior to establishing a connection between modems, the modems may test the communications channel between them. This process may sometimes be referred to as "line probing." Line probing allows a modem to configure itself to improve performance for any given communications channel. Line probing is typically a half-duplex exchange involving the transmission of complex signals that allow the distant receiver to analyze the characteristics of the communications channel before entering data transmission. The modem may use the result of the line probing to choose several operating parameters for the modem, such as data rate, carrier frequency, pre-emphasis selection, power control selection, and so forth. The line characteristics and subsequent modem configuration can significantly impact the performance of the modem. For example, line characteristics can affect the data rate at which the modems communicate information, typically measured in bits per second (bits/s). The term "data rate" as used herein may refer to the speed at which a modem may communicate information.

In one embodiment, the term "information" may refer to any data capable of being represented as a signal, such as an electrical signal, optical signal, acoustical signal and so forth. Examples of information in this context may include data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth.

One line characteristic that may particularly affect modem performance may be spectral attenuation. Spectral attenuation may refer to a phenomenon observed in communication channels where the frequency characteristics of the channel show a sudden attenuation in one or more frequency components. In addition, some components of the modem itself may cause spectral attenuation, such as the analog front end connected to the communications medium. The frequency attenuations may reduce modem performance. For example, they may force the modem to operate at a slower data rate. In another example, they may make certain components of a modem unstable during communication, such as the equalizer. When this occurs the modem may have to retest the communication channel, and potentially fallback to a lower data rate.

One embodiment attempts to solve these and other problems by compensating for spectral attenuation. For example, in one embodiment a determination may be made as to whether spectral attenuation exists for a given communications channel. A compensation filter to compensate for the attenuation may be created in accordance with the determination. The compensation filter may then be used to compensate for the attenuation. By compensating for spectral attenuation, modem performance may be enhanced in terms of stability and higher data rates, for example. Improved modem performance may thereby provide a better experience for the user of the modem.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Referring now in detail to the drawings wherein like parts are designated by like reference numerals throughout, there is illustrated in FIG. 1 a system suitable for practicing one embodiment. FIG. 1 is a block diagram of a system 100 comprising a number of network nodes connected by one or more communications media. A network node ("node") in this context may include any device capable of communicating information, such as a computer, server, switch, router, bridge, gateway, personal digital assistant, mobile device, call terminal and so forth. A communications medium in this context may include any medium capable of carrying information signals, such as twisted-pair wire, co-axial cable, fiber optics, radio frequencies, and so forth. The terms "connection" or "interconnection," and variations thereof, in this context may refer to physical connections and/or logical connections.

More particularly, system 100 may comprise a node 102 and a node 108 connected via a network 106. Nodes 102 and 108 may comprise, for example, Data Terminal Equipment (DTE) such as personal computer (PC). Network 106 may comprise, for example, a circuit-switched network such as the PSTN. Although FIG. 1 shows only two network nodes, it can be appreciated that any number of network nodes may be used in system 100 and still fall within the scope of the invention.

In one embodiment, nodes 102 and 108 may further comprise modems 104 and 110, respectively. Modems 104 and 110 may sometimes be referred to as Data Communications Equipment (DCE). Modems 104 and 110 may be designed to operate in accordance with one or more protocols. In one embodiment, for example, network 106 may operate in accordance with the International Telecommunications Union (ITU) Recommendation V.34 titled "A modem operating at data signal rates of up to 33,600 bits/s for use on the general switched telephone network and on leased point-to-point 2-wire telephone-type circuits," approved in February 1998, and available from "www.itu-.int" ("V.34 Specification"). In general, the V.34 Specification may define a two-wire, full duplex dial-line and leased-line modem supporting both synchronous and asynchronous operations. Although the V.34 Specification may be used herein by way of example, it can be appreciated that the embodiments of the invention are not limited in this context.

In general operation, nodes 102 and 108 may communicate information between each other over network 106 using modems 104 and 110, respectively. For example, node 102 may send a request to modem 104 to initiate a connection with modem 110 of node 108. Modems 104 and 110 will go through a connection process as described in the V.34 Specification as modified below. Part of this connection process includes line probing for the communications channel between modems 104 and 110. The modems may use the results of the line probing to choose several operating parameters for the modem, such as data rate, carrier frequency, pre-emphasis selection, power control selection, and so forth. Once the connection is established, nodes 102 and 108 may begin communicating information over network 106 via modems 104 and 110, respectively.

Figure 2:
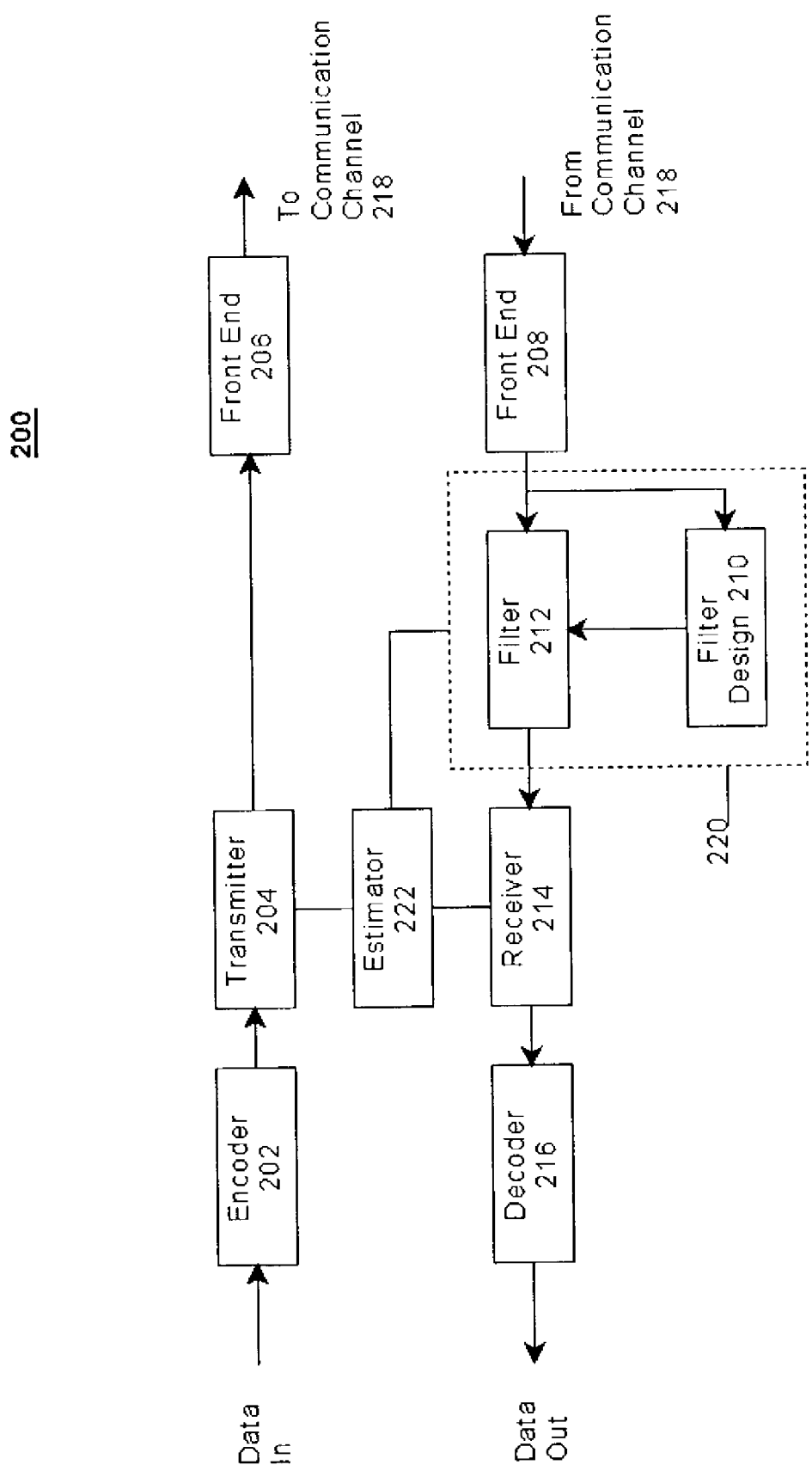
FIG. 2 illustrates a partial block diagram of a modem in accordance with one embodiment.

FIG. 2 is a partial block diagram of a modem in accordance with one embodiment. FIG. 2 may illustrate a modem 200. Modem 200 may be representative of, for example, modems 104 and 110 shown in FIG. 1.

In one embodiment, modem 200 may incorporate functionality that may be implemented as software executed by a processor, hardware circuits or structures, or a combination of both. The processor may be a general-purpose or dedicated processor, such as a processor made by Intel Corporation, Motorola Incorporated, Sun Microsystems Incorporated, Compaq Computer Corporation and others. The processor may also be a specialized processor, such as a digital signal processor (DSP) with accompanying architecture, a network processor, embedded processor, micro-controller, controller and so forth. The software may comprise programming logic, instructions or data to implement certain functionality for an embodiment. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment, the media may store programming instructions in a compressed and/or encrypted format, as well as instructions that may have to be compiled or installed by an installer before being executed by the processor. Alternatively, an embodiment may be implemented as specific hardware components that contain hard-wired logic for performing the recited functionality, or by any combination of programmed general-purpose computer components and custom hardware components.

In one embodiment, modem 200 may comprise an encoder 202, a transmitter 204, an analog front end 206, an analog front end 208, a compensation module 220, a receiver 214, a decoder 216, and a channel estimator 222. In one embodiment, the structure and operation of elements 202, 204, 206, 208, 214, 216 and 222 may conform to the V.34 Specification. The embodiments are not limited with respect to these elements, however, and other modem standards may be used.

In general operation, a first modem may initiate a connection with a second modem via a network, such as network 106. An example of a first and second modem may be modems 104 and 110, respectively. Modem 104 may receive and encode information using encoder 202. The information may originate from node 102, for example. Encoder 202 may send the encoded information to transmitter 204. Transmitter 204 may communicate the information over communication channel 218 via analog front end 206. Transmitted information may be received by receiver 214 via analog front end 208 from communications channel 218. The transmitted information may be, for example, information sent by modem 110. Receiver 214 may send the received information to decoder 216. Decoder 216 may decode the information, and send the decoded signals to another element of node 102, e.g., a monitor. Modem 110 may operate in a similar manner on the transmit and receive side.

Prior to establishing the connection, modems 104 and 110 may utilize channel estimator 222 to test and measure certain characteristics or parameters of the communication channel through network 106. Examples of such characteristics or parameters may include data rate, carrier frequency, bit rate, pre-emphasis requirements, and so forth. The characteristics of a particular communication channel through network 106 may vary considerably, given the number of possible intermediate devices such as switches, network loads, different types and grades of communications mediums, equipment types and configurations, and so forth. Consequently, modem performance may also vary considerably in accordance with these varying characteristics. The testing phase helps to improve modem performance in light of these challenging circumstances.

In one embodiment, the testing phase may comprise a four phase procedure as performed in accordance with the V.34 Specification, for example. Once the four phase procedure is completed, both the source and destination modem may configure the appropriate parameters for optimal transmission given the characteristics of the communications channel. For example, the data rate of a V.34 connection may vary between 2400 bits/s to 33,600 bits/s depending upon the results of the testing process. Once the connection has been established, the modems may begin communicating information over the communication channel.

During the connection process, one embodiment may utilize the results of the second phase of the V.34 four phase procedure to compensate for spectral attenuation. The second phase of the V.34 testing process may send line probing signals to estimate the characteristics of a channel. More particularly, the second phase uses two line probing signals, L1 and L2, to analyze channel characteristics. L1 is a periodic signal with a repetition rate of approximately 150 Hertz (Hz) which consists of a set of tones (cosines) spaced 150 Hz apart at frequencies from 150 Hz to 3750 Hz. Tones at 900 Hz, 1200 Hz, 1800 Hz, and 2400 Hz are omitted. L1 is transmitted for 160 ms with 24 repetitions at 6 Decibels (dB) above the nominal power level. L2 is the same as L1 but is transmitted for no longer than 550 ms plus a round trip delay at the nominal power level. It is worthy to note that the probing tones should be generated with enough accuracy so as not to appreciably affect the channel distortion and noise measurements in the remote receiver.

The second phase of the V.34 four phase procedure results in one or more test signals that are received by the receiving modem, such as modem 110. One such test signal may be referred to herein as an "L sequence" signal. Modem 110 may use the L sequence signal to estimate the channel characteristics, and to decide on various connection parameters, such as data rate, carrier frequency, bit-rate, pre-emphasis requirements, frequency offset, and so forth. In one embodiment, modem 110 may also use the L sequence signal to identify and compensate for spectral attenuation of a communications channel, as discussed in more detail below.

To identify and compensate for spectral attenuation of a communications channel, it may be helpful to view this channel property as a signal processing function. In one embodiment, for example, a single-zero filter may be used to model the attenuation of a frequency component by the communications channel. In this model, the phase of the single-zero filter may represent the particular frequency component being attenuated. The phase of a single-zero filter may be derived, for example, using the following first equation:

$$\varnothing = 2*PI*f_s/f_i \quad (1)$$

where $\varnothing$ represents the phase, $f_S$ represents the attenuated frequency, and $f_i$ represents a sampling frequency. The magnitude of the single-zero filter may represent the level of attenuation of the frequency component. The magnitude of a single-zero filter may be derived, for example, using the following second equation:

$$M = 1 - (P_{av} - P_{min}) \quad (2)$$

where M represents the magnitude, $P_{av}$ represents the average power, and $P_{min}$ represents the minimal power.

Modeling spectral attenuation as a single-zero filter may facilitate the design of an appropriate transfer function or compensation technique. The filter that compensates for the effect of a single-zero filter may be, for example, a single-pole filter at the same magnitude and phase. Consequently, a single-pole filter may be designed by the receiver at run time, with the pole magnitude and phase matching that of the single-zero filter. Since the phase and magnitude of the single-zero filter identifies the attenuated frequency component(s) and their level of attenuation, respectively, the single-pole filter may be configured with the appropriate filter parameters to compensate for the effects of spectral attenuation over the communications channel.

Referring again to FIG. 2, compensation module 220 may compensate for spectral attenuation for modem 200 using the principles discussed above. In one embodiment, compensation module 220 may comprise a filter design module 210 and a filter 212.

In one embodiment, filter design module 210 may receive the L sequence signal to determine filter parameters for filter 212. The filter parameters may be, for example, the phase and magnitude for single-pole filter 212. The filter parameters may be determined in accordance with equations (1) and (2), as discussed in more detail with reference to FIGS. 3-9. Once filter design module 210 examines the L sequence signal and determines the appropriate filter parameters, it sends the filter parameters to filter 212.

In one embodiment, filter 212 may receive the filter parameters from filter design module 210. Filter 212 may be a single-pole filter capable of having varying filter parameters. Filter 212 may be implemented as a first order Infinite Impulse Response (IIR) filter, for example. Filter 212 may use the filter parameters to configure its phase and magnitude to match the single-zero filter model parameters. Once the communication channel has been established between modems 104 and 110, filter 212 may compensate for spectral attenuation on the communications channel.

In one embodiment, compensation module 220 may be implemented as a DSP and accompanying architecture. Compensation module 220 may be implemented in both linear time invariant systems and time variant systems. In the case of linear time invariant systems such as data modems, it may be desirable to configure filter 212 once during the testing phase, although the embodiments are not limited in this context. For example, filter 212 may be periodically reconfigured as desired, such as when there is a change in the characteristics of the communications channel or when a component of modem 200 becomes unstable, thereby requiring a retraining and testing process. For time variant systems, compensation module 220 may configure filter 212 during the testing phase, and then periodically thereafter in accordance with the particular characteristics of the time variant system or when system conditions warrant re-configuration of filter 212.

Once filter design module 210 determines the appropriate filter parameters, filter 212 may be configured and implemented during the data transfer phase. Filter 212 may be implemented, for example, within 10-15 processing cycles per sample. Although only a single frequency component was illustrated herein for purposes of clarity, it can be appreciated that compensation module 220 may compensate for multiple spectral attenuations as desired.

The operations of systems 100 and 200 may be further described with reference to FIGS. 3-5 and accompanying examples. Although FIGS. 3-5 as presented herein may include a particular programming logic, it can be appreciated that the programming logic merely provides an example of how the general functionality described herein can be implemented. Further, each operation within a given programming logic does not necessarily have to be executed in the order presented unless otherwise indicated.

Figure 3:
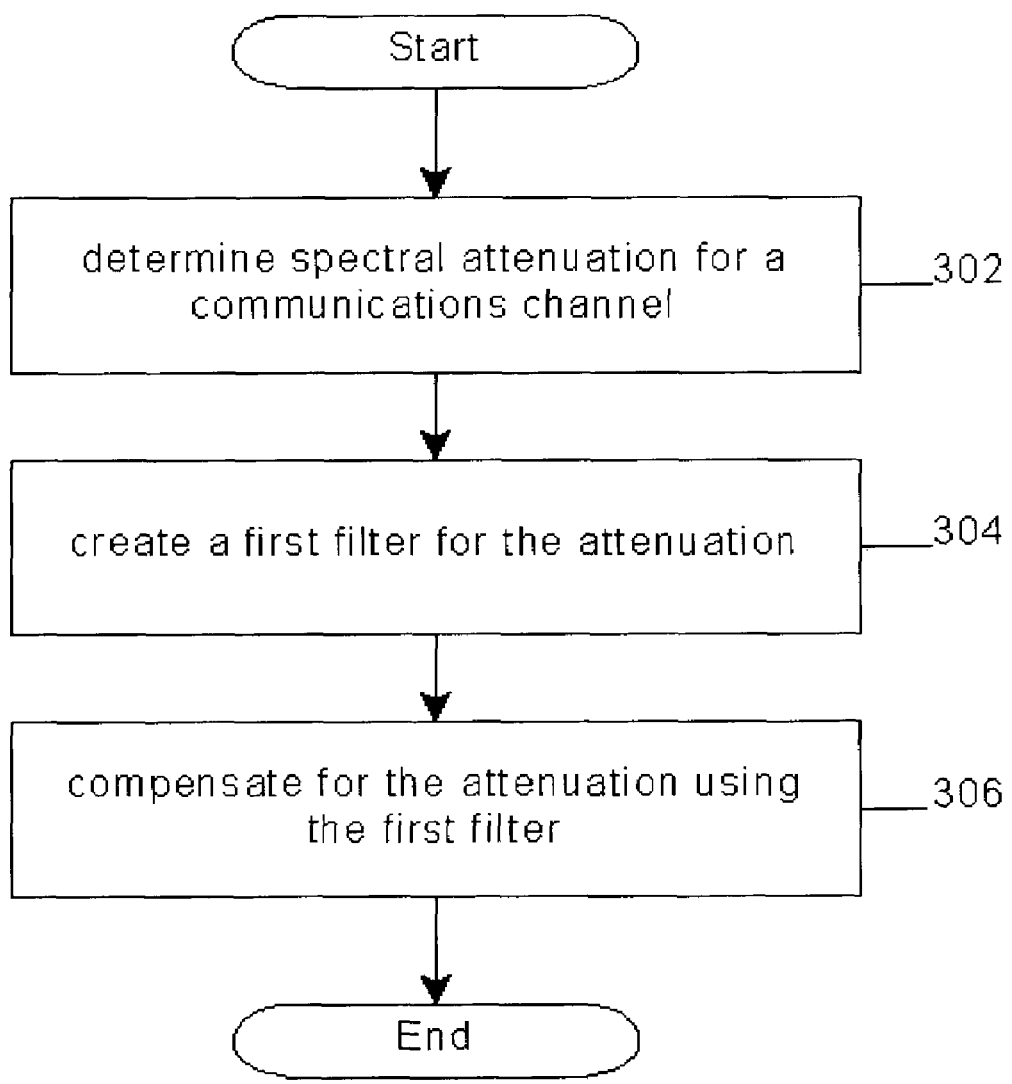
FIG. 3 is a first block flow diagram of the programming logic performed by a compensation module in accordance with one embodiment.
Figure 4:
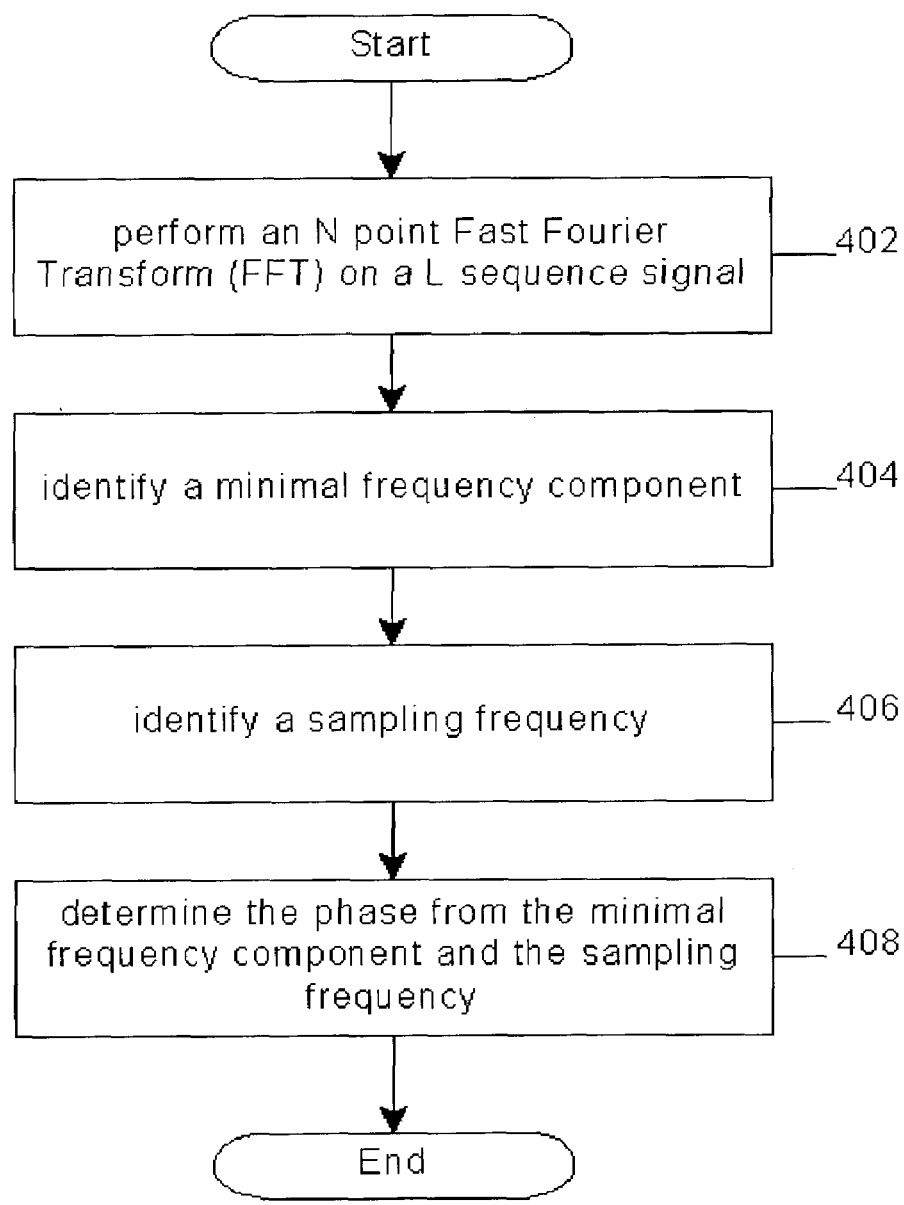
FIG. 4 is a second block flow diagram of the programming logic performed by a compensation module in accordance with one embodiment.
Figure 5:
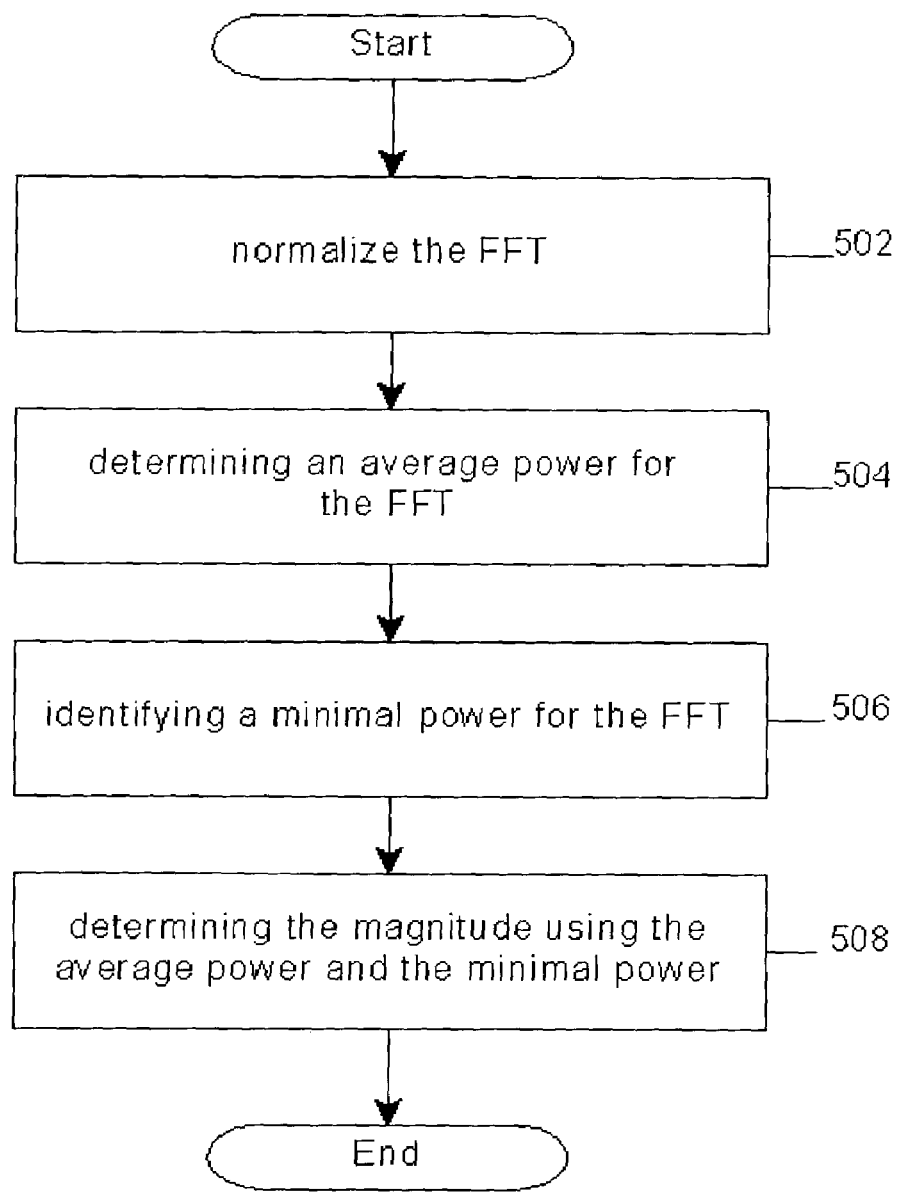
FIG. 5 is a third block flow diagram of the programming logic performed by a compensation module in accordance with one embodiment.

FIGS. 3-5 are block flow diagrams of the programming logic for a compensation module in accordance with one embodiment. This module may refer to the software and/or hardware used to implement the functionality for one or more embodiments as described herein. In this embodiment, the module may be implemented as part of a modem 200. It can be appreciated that this functionality, however, may be implemented by any device, or combination of devices, located anywhere in a communication network and still fall within the scope of the invention.

FIG. 3 is a first block flow diagram of the programming logic performed by a compensation module in accordance with one embodiment. FIG. 3 illustrates a programming logic 300. As shown in programming logic 300, spectral attenuation for a communications channel may be determined at block 302. A first filter to compensate for the attenuation may be created at block 304. An example of the first filter may be a single-pole filter. Further, the single-pole filter may be implemented as a first order IIR filter. The first filter may compensate for the attenuation at block 306.

In one embodiment, the determination at block 302 may be performed by receiving and examining a L sequence signal. The L sequence signal may be modeled as a second filter. An example of the second filter may be a single-zero filter. An example of an L sequence signal may be an L sequence signal as defined in the V.34 Specification.

In one embodiment, the creating at block 304 may be performed by determining a phase and magnitude for the first filter based on the model of the second filter. The phase may identify an attenuated frequency. The magnitude may identify a level of attenuation for the frequency.

FIG. 4 is a second block flow diagram of the programming logic performed by a compensation module in accordance with one embodiment. FIG. 4 illustrates a programming logic 400. As shown in programming logic 400, the phase may be determined by examining the L sequence signal. More particularly, an N point Fast Fourier Transform (FFT) may be performed for the received L sequence signal at block 402. A minimal frequency component may be identified at block 404. The minimal frequency component may be confirmed through a separate operation. This may occur by comparing the minima with the pre and post bins, for example. A sampling frequency may be identified at block 406. The determination may be performed using the minimal frequency component and the sampling frequency at block 408. In one embodiment, the determination at block 408 may be performed in accordance with $\emptyset=2*PI*f_i/f_s$, as discussed previously.

FIG. 5 is a third block flow diagram of the programming logic performed by a compensation module in accordance with one embodiment. FIG. 5 illustrates a programming logic 500. As shown in FIG. 5, the magnitude may also be determined by examining the L sequence signal. More particularly, the FFT may be normalized at block 502. An average power for the FFT may be determined at block 504. A minimal power for the FFT may be identified at block 506. The magnitude may be determined using the average power and the minimal power at block 508. In one embodiment, the determination at block 508 may be performed in accordance with $M=1-(P_{av}-P_{min})$, as discussed previously.

The operation of systems 100 and 200, and the programming logic shown in FIGS. 3-5, may be better understood by way of FIGS. 6-9 and accompanying description. FIGS. 6-9 may illustrate an example of modeling the frequency attenuation characteristics of the communications channel by a single-zero filter.

For purposes of this example, assume node 102 desires to connect to node 108 to communicate information. Node 102 may be a PC. Node 108 may be a web server. The information may be, for example, a Hypertext Markup Language (HTML) document stored at web server 108. To connect to web server 108, PC 102 may send a signal to V.34 modem 104 to connect to V.34 modem 110 via PSTN 106. V.34 modem 104 may send a request to V.34 modem 110 to initiate a connection, such as communication channel 218, using the V.34 connection process.

During the connection process, channel estimator 222 may test and measure characteristics of the communications channel between V.34 modems 104 and 110. During the second phase of the four phase testing process, compensation module 220 of V.34 modem 110 may receive an L sequence signal. An example of a received L sequence signal may be shown in FIG. 6.

Figure 6:
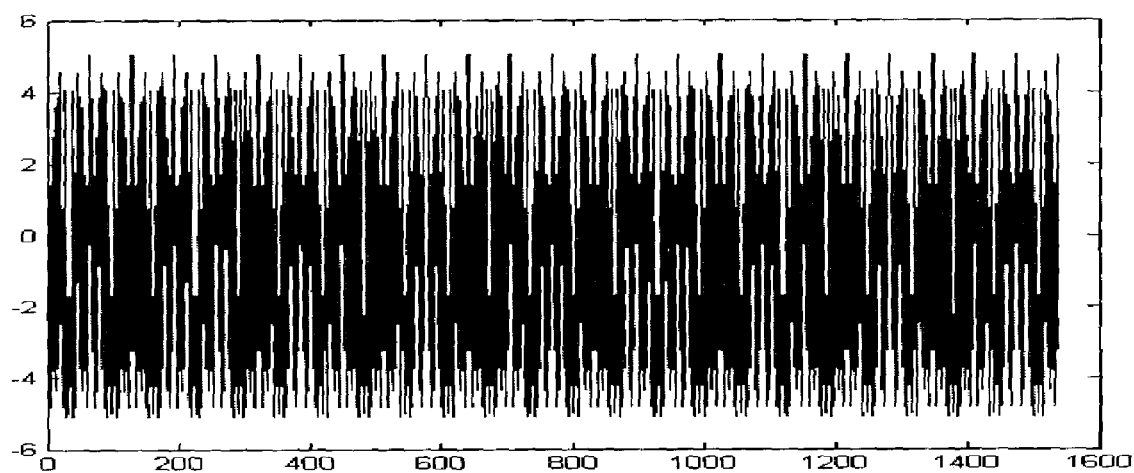
FIG. 6 is a diagram of a time domain L sequence signal in accordance with one embodiment.

FIG. 6 is a diagram of a time domain L sequence signal in accordance with one embodiment. FIG. 6 illustrates a time domain L sequence signal received by compensation module 220. Compensation module 220 receives the time domain L sequence signal and transforms it to the frequency domain. Compensation module 220 may then model the frequency domain L sequence signal as if it were the output of a single-zero filter, with the phase of the single-zero filter identifying the attenuated frequency, and the magnitude of the single-zero filter identifying the level of attenuation. Compensation module 220 would determine a phase filter parameter and magnitude filter parameter for a single-pole filter, such as filter 212, based on the model. Once configured with the appropriate filter parameters, single-pole filter 212 could then be used to reduce or remove spectral attenuation from communications channel 218.

More particularly, to determine the appropriate phase filter parameter, filter design module 210 may perform an N point FFT on the time domain L sequence signal. Filter design module 210 may identify a minimal frequency component and a sampling frequency. Using the minimal frequency component and sampling frequency, filter design module 210 may determine the phase filter parameter in accordance with $\emptyset=2*PI*f_i/f_s$. For example, assume the attenuated frequency is 2400 Hz. Further assume the sampling frequency is 9600 Hz. The phase filter parameter would then be calculated as $\emptyset=2*Pi*2400/9600$, or Pi/2.

To determine the appropriate magnitude filter parameter, filter design module 2104 may normalize the FFT of the time domain L sequence signal. Filter design module 210 may identify an average power and a minimal power for the FFT. Using the average power and minimal power, filter design module 210 may determine the magnitude filter parameter in accordance with $M=1-(P_{av}-P_{min})$. For example, assuming an average power of 0.7 and a minimal power 0.2, the magnitude filter parameter would then be calculated as $1-(0.7-0.2)=0.5$.

Once filter design module 210 determines the appropriate phase and magnitude filter parameters, it may send the parameters Pi/2 and 0.5 to filter 212 of modems 104 and 110. Filter 212 of modem 110 may use the phase and magnitude filter parameters to filter the received signals from modem 104 to remove spectral attenuation for frequency component at 2400 Hz. Similarly, filter 212 of modem 104 may use the phase and magnitude filter parameters to filter the received signals from modem 110. As a result, modems 104 and 110 may experience a better quality of communications, such as allowing operations at a higher baud rate, for example.

Figure 7:
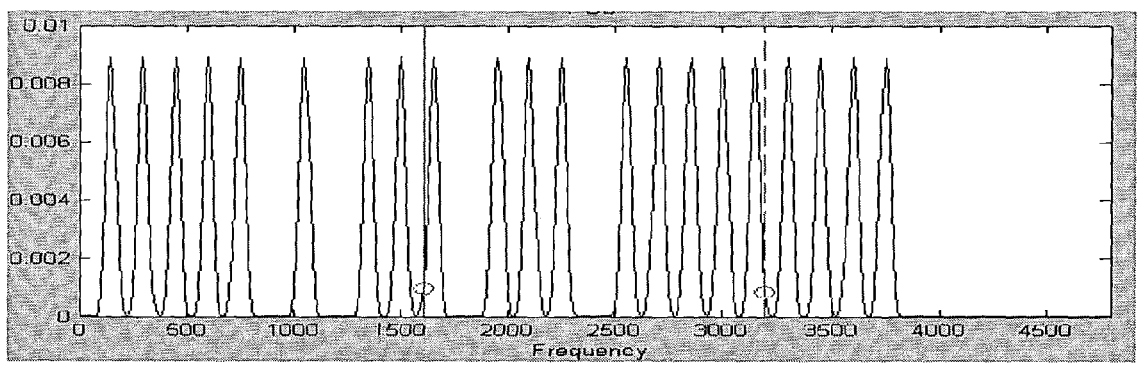
FIG. 7 is a diagram of a frequency spectrum for a L sequence signal in accordance with one embodiment.
Figure 8:
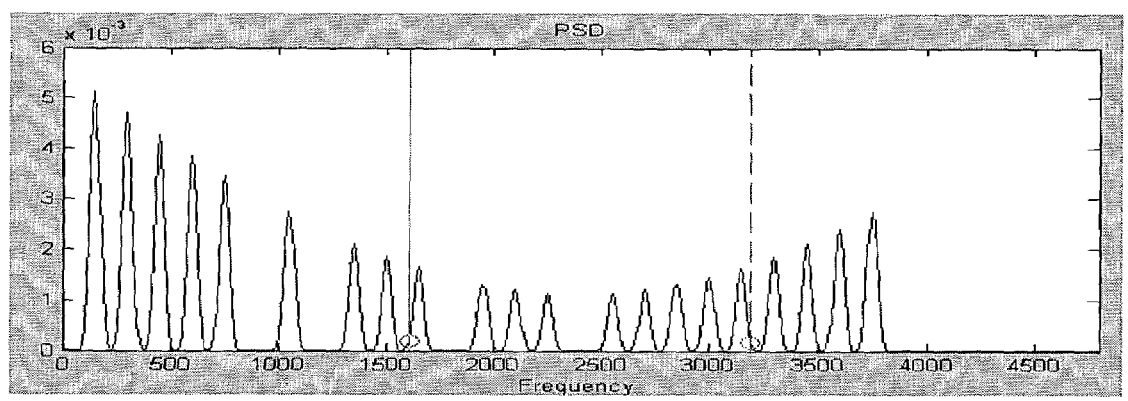
FIG. 8 is a diagram of a frequency spectrum for a L sequence signal after filtering by a single-zero filter in accordance with one embodiment.
Figure 9:
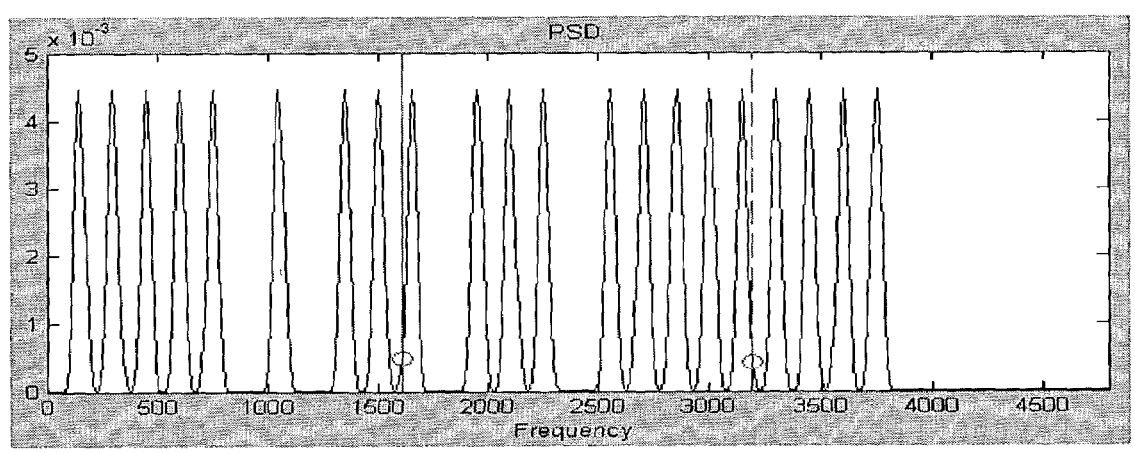
FIG. 9 is a diagram of a frequency spectrum for a L sequence signal after filtering by a single-pole filter in accordance with one embodiment.

FIGS. 7-9 may illustrate the frequency spectrum for an L sequence signal before filtering by a single-zero filter, after filtering by a single-zero filter, and as filtered by a single-pole filter of the same phase and magnitude of the single-zero filter. This may demonstrate that a single-pole filter having the same phase and magnitude as the modeled single-zero filter may reduce or remove spectral attenuation of a given frequency component.

FIG. 7 is a diagram of a frequency spectrum for a L sequence signal in accordance with one embodiment. FIG. 7 illustrates a frequency spectrum for a L sequence signal without any filtering.

FIG. 8 is a diagram of a frequency spectrum for a L sequence signal after filtering by a single-zero filter in accordance with one embodiment. FIG. 8 illustrates a frequency spectrum for the L sequence signal of FIG. 7 after it has been filtered by a single-zero filter having a phase of Pi/2 and a magnitude of 0.5.

FIG. 9 is a diagram of a frequency spectrum for a L sequence signal after filtering by a single-pole filter in accordance with one embodiment. FIG. 9 illustrates a frequency spectrum for the L sequence signal of FIG. 8 after it has been filtered by a single-pole filter having a phase of Pi/2 and a magnitude of 0.5. It can be seen that the frequency spectrum of the L sequence of FIG. 9 approximately matches that of FIG. 7. Therefore, by modeling the spectral attenuation of an L sequence as a single-zero filter, compensation module 220 may design and configure a single-pole filter to reduce or remove spectral attenuation of a given frequency component from a communications channel, such as communications channel 218, for example.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to compensate for spectral attenuation, comprising:
   determining spectral attenuation for a communications channel;
   creating a first filter for said attenuation; and
   compensating for said attenuation using said first filter;
   wherein said determining comprises;
      receiving a L sequence signal; and
      modeling spectral attenuation of said L sequence signal as a second filter.

2. The method of claim 1, wherein said creating comprises determining a phase and magnitude for said first filter based on said second filter, with said phase identifying an attenuated frequency and said magnitude identifying a level of attenuation for said frequency.

3. The method of claim 2, wherein determining said phase comprises:
   performing an N point Fast Fourier Transform (FFT) on said L sequence signal;
   identifying a minimal frequency component;
   identifying a sampling frequency; and
   determining said phase from said minimal frequency component and said sampling frequency.

4. The method of claim 3, further comprising confirming said minimal frequency component.

5. The method of claim 4, wherein said determining said phase from said minimal frequency component and said sampling frequency is performed in accordance with $\emptyset=2*PI*f_i/f_s$, where $\emptyset$ represents said phase, $f_i$ represents said attenuated frequency, and $f_s$ represents a sampling frequency.

6. The method of claim 5, wherein said determining said magnitude comprises:
   normalizing said FFT;
   determining an average power for said FFT;
   identifying a minimal power for said FFT; and
   determining said magnitude using said average power and said minimal power.

7. The method of claim 6, wherein said determining said magnitude using said average power and said minimal power is performed in accordance with $M=1-(P_{av}-P_{min})$, where M represents said magnitude, $P_{av}$ represents said average power, and $P_{min}$ represents said minimal power.

8. The method of claim 1, wherein said first filter is a single pole filter.

9. The method of claim 1, wherein said second filter is a single-zero filter.

10. A compensation module, comprising:
    a filter design module to receive a L sequence signal and design a set of filter parameters to compensate for spectral attenuation of a communication channel; and
    a filter connected to said filter design module to receive said filter parameters and use said filter parameters to compensate for said spectral attenuation;
    wherein said filter parameters comprise a phase and magnitude for a single-zero filter.

11. The compensation module of claim 10, wherein said filter is a single pole filter.

12. A modem comprising:
    an encoder;
    a transmitter connected to said encoder;
    an analog front end connected to said transmitter;
    a compensation module connected to said analog front end;
    a receiver connected to said compensation module;
    a decoder connected to said receiver; and
    a channel estimator connected to said transmitter, said receiver and said compensation module;
    wherein said compensation module comprises:
       a filter design module; and
       a filter connected to said filter design module;
          wherein said filter design module receives a L sequence signal and designs a set of filter parameters using said L sequence signal, and sends said filter parameters to said filter; and
          said filter receives said filter parameters and uses said filter parameters to compensate for said spectral attenuation;
          wherein said filter parameters comprise a phase and magnitude for single-zero filter.

13. An article comprising:
    a storage medium;
    said storage medium including stored instructions that, when executed by a processor, result in determining spectral attenuation for a communications channel, creating a filter for said attenuation during said determination, and compensating for said attenuation using said filter, wherein said determining comprises receiving a L sequence signal and modeling spectral attenuation of said L sequence signal as a second filter.

14. The article of claim 13, wherein the stored instructions, when executed by a processor, further result in determining a set of filter parameters for said filter, with a first parameter being a phase determined in accordance with $\emptyset=2*PI*f_i/f_s$, where $\emptyset$ represents said phase, $f_i$ represents an attenuated frequency, and $f_s$ represents a sampling frequency, and a second parameter being a magnitude determined in accordance with $M=1-(P_{av}-P_{min})$, where M represents said magnitude, $P_{av}$ represents an average power, and $P_{min}$, represents a minimal power.

* * * * *

UNITED STATES PATENT AND TRADEMARK OFFICE
CERTIFICATE OF CORRECTION

PATENT NO. : 7,369,603 B2 Page 1 of 1
APPLICATION NO. : 10/447339
DATED : May 6, 2008
INVENTOR(S) : Nair It is certified that error appears in the above-identified patent and that said Letters Patent is hereby corrected as shown below:

In column 9, line 48, in Claim 1, delete "comprises;" and insert -- comprises: --, therefor.

In column 10, line 34, in Claim 12, after "modem" insert -- , --.

In column 10, line 55, in Claim 12, after "for" insert -- a --.

In column 12, line 3, in Claim 14, after "$P_{min}$" delete ",".

Signed and Sealed this

Nineteenth Day of August, 2008

JON W. DUDAS
*Director of the United States Patent and Trademark Office*